United States Patent
Liu et al.

(10) Patent No.: US 11,588,391 B1
(45) Date of Patent: Feb. 21, 2023

(54) POWER CONVERSION STRUCTURE, SYSTEM, METHOD, ELECTRONIC DEVICE INCLUDING POWER CONVERSION STRUCTURE, AND CHIP UNIT

(71) Applicant: NuVolta Technologies (Hefei) Co., Ltd., Hefei (CN)

(72) Inventors: Cheng Liu, Shanghai (CN); Fuchun Zhan, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 0 days.

(21) Appl. No.: 17/846,403

(22) Filed: Jun. 22, 2022

(30) Foreign Application Priority Data

Mar. 24, 2022 (CN) .......................... 202210291758.X

(51) Int. Cl.
  *H02J 7/00* (2006.01)
  *H02M 1/00* (2006.01)
  *H02M 3/156* (2006.01)

(52) U.S. Cl.
  CPC ....... *H02M 1/0054* (2021.05); *H02J 7/00712* (2020.01); *H02M 1/0095* (2021.05); *H02M 3/156* (2013.01)

(58) Field of Classification Search
  CPC .. H02M 1/0054; H02M 1/0095; H02M 3/156; H02J 7/00712
  USPC .................................................. 320/140, 164
  See application file for complete search history.

(56) References Cited

U.S. PATENT DOCUMENTS

| 10,075,080 B1* | 9/2018 | Scoones ................ H02M 3/158 |
| 2016/0118886 A1* | 4/2016 | Zhang ................... H02M 3/158 323/271 |
| 2021/0336541 A1 | 10/2021 | Xie et al. |

FOREIGN PATENT DOCUMENTS

| CN | 106797180 A | 5/2017 |
| CN | 113273070 A | 8/2021 |
| CN | 113507149 A | 10/2021 |
| CN | 113612386 A | 11/2021 |
| CN | 114094684 A | 2/2022 |
| CN | 114142723 A | 3/2022 |

* cited by examiner

*Primary Examiner* — Zixuan Zhou
(74) *Attorney, Agent, or Firm* — Slater Matsil, LLP

(57) ABSTRACT

A power conversion structure, a power conversion system, a power conversion method, an electronic device including the power conversion structure, and a chip unit are provided. By connecting one switched capacitor series branch between a third terminal of a first switch series branch and a ground terminal, when the power conversion structure needs to operate in a switched capacitor converter mode, a direct current part of a current output from the third terminal of the first switch series branch flows to an inductor, and only an alternating current component flows through an on-state first switch, such that the on-state loss of the first switch can be greatly reduced, and the efficiency of the power conversion structure can be improved.

12 Claims, 13 Drawing Sheets

POWER CONVERSION STRUCTURE, SYSTEM, METHOD, ELECTRONIC DEVICE INCLUDING POWER CONVERSION STRUCTURE, AND CHIP UNIT

PRIORITY CLAIM

This disclosure claims the benefit of and priority to Chinese Patent Application No. 202210291758.X, filed on Mar. 24, 2022, which is hereby incorporated by reference in its entirety.

TECHNICAL FIELD

The present invention relates to the field of power supplies, and in particular relates to a power conversion structure, a power conversion system, a power conversion method, an electronic device including the power conversion structure, and a chip unit.

BACKGROUND

As technology continues to advance, various electronic devices, such as portable devices (including cell phones, tablet computers, digital cameras, MP3 players, watches, and/or other similar electronic devices) have become popular. Each electronic device may employ a plurality of chargeable battery units which are connected in series and/or in parallel to form a chargeable battery for storing electric energy. The chargeable battery can be charged by an adapter connected to the electronic device and a power conversion structure in the electronic device, thus recovering the energy of the battery, and the chargeable battery may be various types of batteries, such as Li-ion batteries.

The current market expects that the power conversion structure can complete the charge of the battery in a shorter time; and meanwhile, the market expects that the power conversion structure is small in volume, high in efficiency and low in cost so as to meet the consumer demands for miniaturization, high efficiency and low cost of the electronic devices.

There are a variety of power conversion structures suitable for charging the chargeable batteries. A schematic diagram of a battery charging system in the prior art shown in FIG. 1 is more commonly used at present. In FIG. 1, an adapter 10 provides a bus voltage Vbus to a switched capacitor converter 21 and a switched converter or a linear converter 22. In a practical application, when the battery 300 is in a fast charging stage, the switched capacitor converter 21 is controlled to operate to convert the bus voltage Vbus into a first output voltage Vout1 to charge the battery 300. When the battery 300 is in a trickle charging stage, a pre-charging stage or a charging termination stage, the switched converter or the linear converter 22 is controlled to operate to convert the bus voltage Vbus into a second output voltage Vout1 to charge the battery 300 so as to meet the demands of different charging stages of the battery 300.

However, the battery charging system shown in FIG. 1 needs two converters to charge the battery 300, leading to large volume and high cost of the battery charging system.

Please refer to a schematic diagram of a battery charging system in another prior art shown in FIG. 2, in FIG. 2, a switch S1 to a switch S4 are connected in series between an input terminal din and a ground terminal GND, a flying capacitor Cf is connected between a common node of the switch S1 and the switch S2 and a common node of a switch S3 and a switch S4, an inductor L is connected between a common node of the switch S2 and the switch S3 and one terminal of an output capacitor Cout, the other terminal of the output capacitor Cout is grounded, and both terminals of the inductor L are connected in parallel to a switch series branch formed by the switch S11 and the switch S22 reversely connected in series. In the practical application, when the battery 300 is in the fast charging stage, a switch S11 and a switch S22 are controlled to be turned on, and the switch S1 to the switch S4, a flying capacitor Cf and the output capacitor Cout form a switched capacitor converter to charge the battery 300. When the battery 300 is in the trickle charging stage, the pre-charging stage or the charging termination stage, the switch S11 and the switch S22 are controlled to be turned off, the switch S1 to the switch S4, the flying capacitor Cf and the inductor L form a three-level converter to charge the battery 300 so as to meet the demands of different charging stages of the battery 300.

However, the battery charging system shown in FIG. 2 needs to connect two switches (the switch S11 and the switch S22) in parallel to both terminals of the inductor L to achieve the switching between the three-level converter and the switched capacitor converter. When the battery charging system operates in a switched capacitor converter mode, an output current thereof flows through the switch S11 and the switch S22, leading to large loss and low efficiency of the switched capacitor converter; the performance requirements on the switch S11 and the switch S22 are high, leading to large volume and high cost of the battery charging system; and the driving circuits of the switch S11 and the switch S22 are complicated.

Therefore, an existing power conversion structure cannot achieve small volume, low cost and high efficiency on the basis of meeting fast charging.

SUMMARY

A power conversion structure is provided, which includes an input terminal receiving an input voltage; a first switch series branch comprising a plurality of switches connected in series and comprising a first terminal, a second terminal, a third terminal, a first upper plate node, and a first lower plate node, wherein the first terminal of the first switch series branch is connected to the input terminal, the second terminal of the first switch series branch is connected to a ground terminal, and the third terminal of the first switch series branch is connected to a first terminal of an inductor; a first flying capacitor connected between the first upper plate node and the first lower plate node; and a switched capacitor series branch comprising a first terminal and a second terminal, wherein the first terminal of the switched capacitor series branch is connected to the third terminal of the first switch series branch, the second terminal of the switched capacitor series branch is connected to the ground terminal, and the switched capacitor series branch includes a first switch and a first output capacitor connected in series, the first switch having a first control node.

A power conversion system is further provided, which includes a power conversion structure; a control unit connected to control nodes of switches in the power conversion structure, and configured to output a switch control signal to the control nodes of the switches in the power conversion structure so as to configure the power conversion structure to operate in a first operating mode or a second operating mode. In the first operating mode, a first switch is configured as an off state, thereby the first switch series branch, the first flying capacitor and the inductor being configured as a three-level buck converter. In the second operating mode, the first switch is configured as an on state, thereby the first switch series branch, the first flying capacitor and the first output capacitor being configured as a switched capacitor converter.

An electronic device is further provided, which includes the power conversion structure; a battery, wherein a first terminal of the battery is connected to a second terminal of the inductor via a sixth switch, and a second terminal of the battery is grounded; and a load connected to the second terminal of the inductor so as to receive an electric signal output from the second terminal of the inductor.

A power conversion method is further provided, which includes coupling a power conversion structure to a battery, wherein the power conversion structure includes an input terminal receiving an input voltage; a first switch series branch including a plurality of switches connected in series and including a first terminal, a second terminal, a third terminal, a first upper plate node and a first lower plate node, wherein the first terminal of the first switch series branch is connected to the input terminal, the second terminal of the first switch series branch is connected to a ground terminal, and the third terminal of the first switch series branch is connected to a first terminal of an inductor; a first flying capacitor connected between the first upper plate node and the first lower plate node; a switched capacitor series branch including a first terminal and a second terminal, wherein the first terminal of the switched capacitor series branch is connected to the third terminal of the first switch series branch, the second terminal of the switched capacitor series branch is connected to the ground terminal, and the switched capacitor series branch includes a first switch and a first output capacitor connected in series, the first switch having a first control node; providing the input voltage; and in response to different charging conditions of the battery, configuring the power conversion structure as different operating modes.

A chip unit is further provided, which includes an input pin receiving an input voltage; a second switch connected between the input pin and a first upper plate node and having a second control node; a third switch connected between the first upper plate node and a first intermediate node and having a third control node, wherein the first intermediate node is connected to a conversion pin, and the conversion pin is configured to connect a first terminal of an inductor located outside of the chip unit; a fourth switch connected between the first intermediate node and the first lower plate node and having a fourth control node; a fifth switch connected between the first lower plate node and a ground pin and having a fifth control node; a first switch, wherein a first terminal of the first switch is connected to a switch pin and a second terminal of the first switch is connected to the ground pin, the first switch has a first control node, the switch pin is configured to connect a first terminal of a first output capacitor located outside the chip unit, a second terminal of the first output capacitor is connected to the first terminal of the inductor, or, the first terminal of the first switch is connected to the conversion pin, the second terminal of the first switch is connected to a switch pin, the first switch has a first control node, the switch pin is configured to connect the first terminal of the first output capacitor located outside the chip unit, and the second terminal of the first output capacitor is connected to the ground pin; a first flying capacitor upper pin connected to the first upper plate node and configured to connect a first terminal of a first flying capacitor located outside of the chip unit; a first flying capacitor lower pin connected to the first lower plate node and configured to connect a second termi-nal of the first flying capacitor located outside the chip unit; a system terminal pin configured to connect a second terminal of the inductor; a battery terminal pin configured to connect a battery located outside the chip unit.

DETAILED DESCRIPTION OF ILLUSTRATIVE EMBODIMENTS

Figure 1:
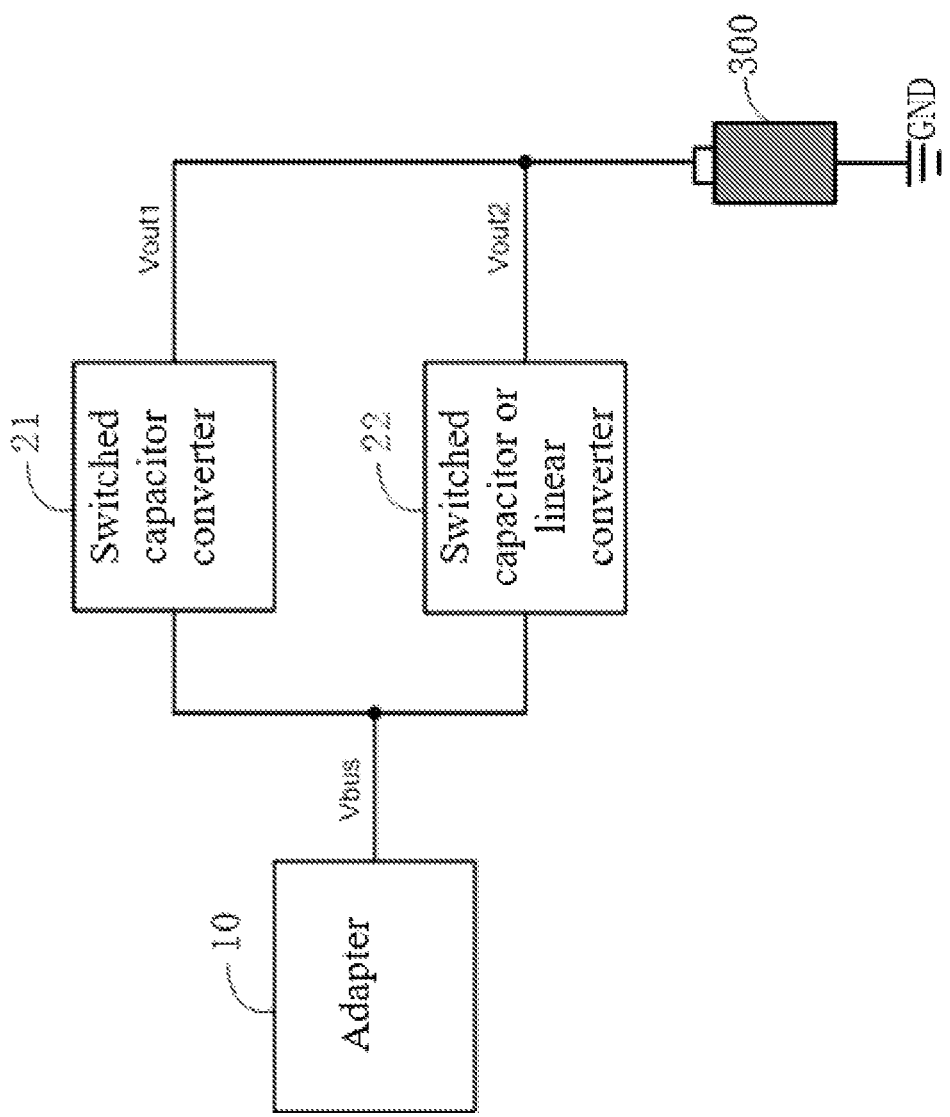
FIG. 1 is a schematic diagram of a battery charging system in the prior art.
Figure 2:
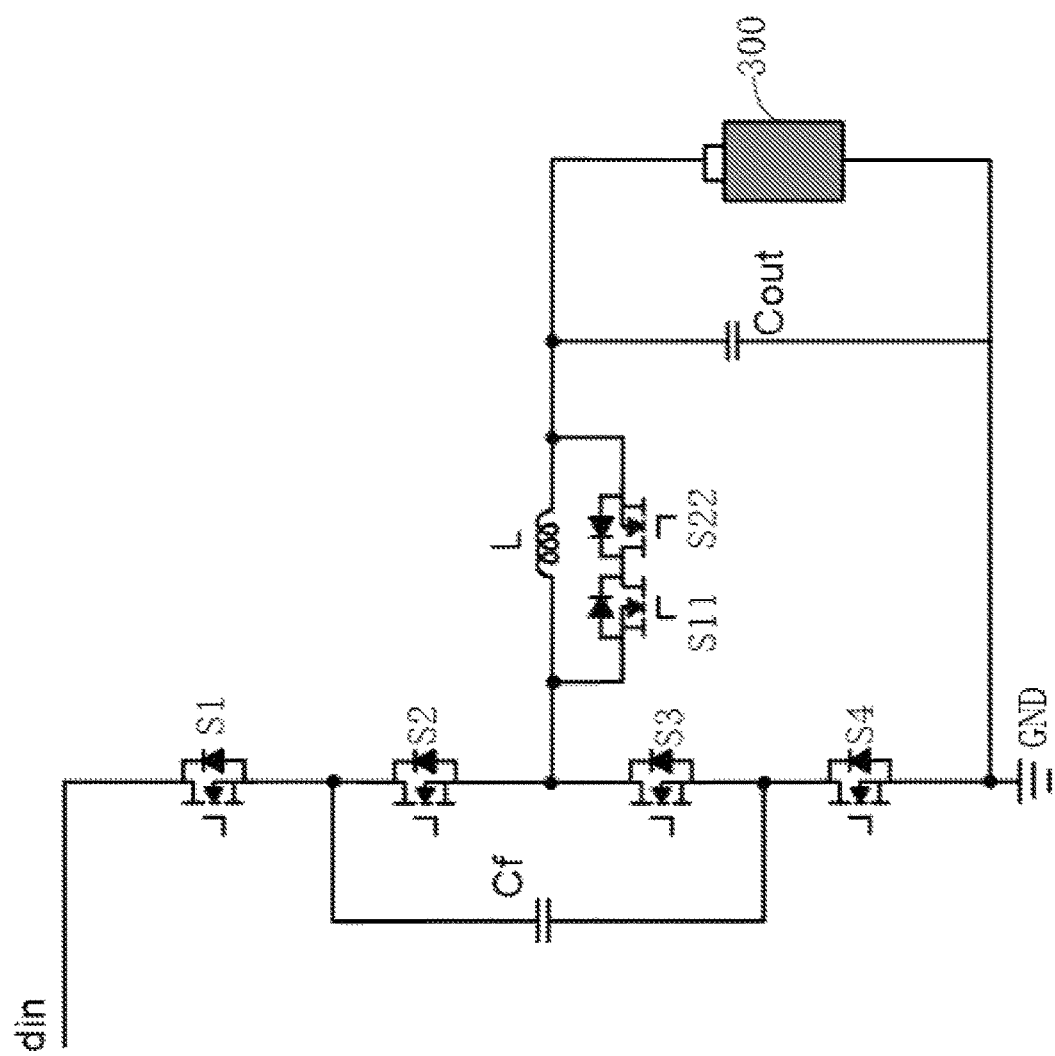
FIG. 2 is a schematic diagram of a battery charging system in another prior art.

The technical solutions in the present invention are clearly and completely described below with reference to the accompanying drawings. Apparently, the described embodiments are a part rather than all embodiments of the present invention. All other embodiments obtained by that ordinary skill in the art without creative effects based on the embodiments of the present invention fall within the scope of protection of the present invention.

In an embodiment of the present invention, a power conversion structure which can be applied to an electronic device is provided. Specifically, please refer to a schematic diagram of a power conversion structure of an embodiment of the present invention shown in FIG. 3, the power conversion structure 100 includes an input terminal din receiving an input voltage Vin; a first switch series branch 110 including a plurality of switches connected in series and including a first terminal d11, a second terminal d12, a third terminal d13, a first upper plate node dH1, and a first lower plate node dL1, wherein the first terminal d11 of the first switch series branch 110 is connected to the input terminal din, the second terminal d12 of the first switch series branch 110 is connected to a ground terminal GND, and the third terminal d13 of the first switch series branch 110 is connected to a first terminal of an inductor L1; a first flying capacitor Cf1 connected between the first upper plate node dH1 and the first lower plate node dL1; and a switched capacitor series branch 210 including a first terminal d31 and a second terminal d32, wherein the first terminal d31 of the switched capacitor series branch 210 is connected to the third terminal d13 of the first switch series branch 110, the second terminal d32 of the switched capacitor series branch 210 is connected to the ground terminal GND, and the switched capacitor series branch 210 includes a first switch Q1 and a first output capacitor Cout1 connected in series, the first switch Q1 having a first control node dQ1.

As above, the switched capacitor series branch 210 is connected between the third terminal d13 of the first switch series branch 110 and the ground terminal GND, when the power conversion structure needs to operate in a switched capacitor converter mode, the first switch Q1 is controlled to be turned on, thus the first output capacitor Cout1 is connected between the third terminal d13 of the first switch series branch 110 and the ground GND to make the first switch series branch 110, the first flying capacitor Cf1 and the first output capacitor Cout1 form the switched capacitor converter to output a voltage Vout, while the inductor L1 only plays a role in filtering. In accordance with the characteristics of the capacitor, a direct current part of a current output from the third terminal d13 of the first switch series branch 110 flows to the inductor L1, and only an alternating current component flows through an on-state first switch Q1, such that the on-state loss of the first switch Q1 can be greatly reduced, and the efficiency of the power conversion structure is improved. As the first switch Q1 is relatively low in on-state loss and less in heating quantity, the selectivity of the first switch Q1 is large, and the cost of the power conversion structure can be reduced.

Figure 3:
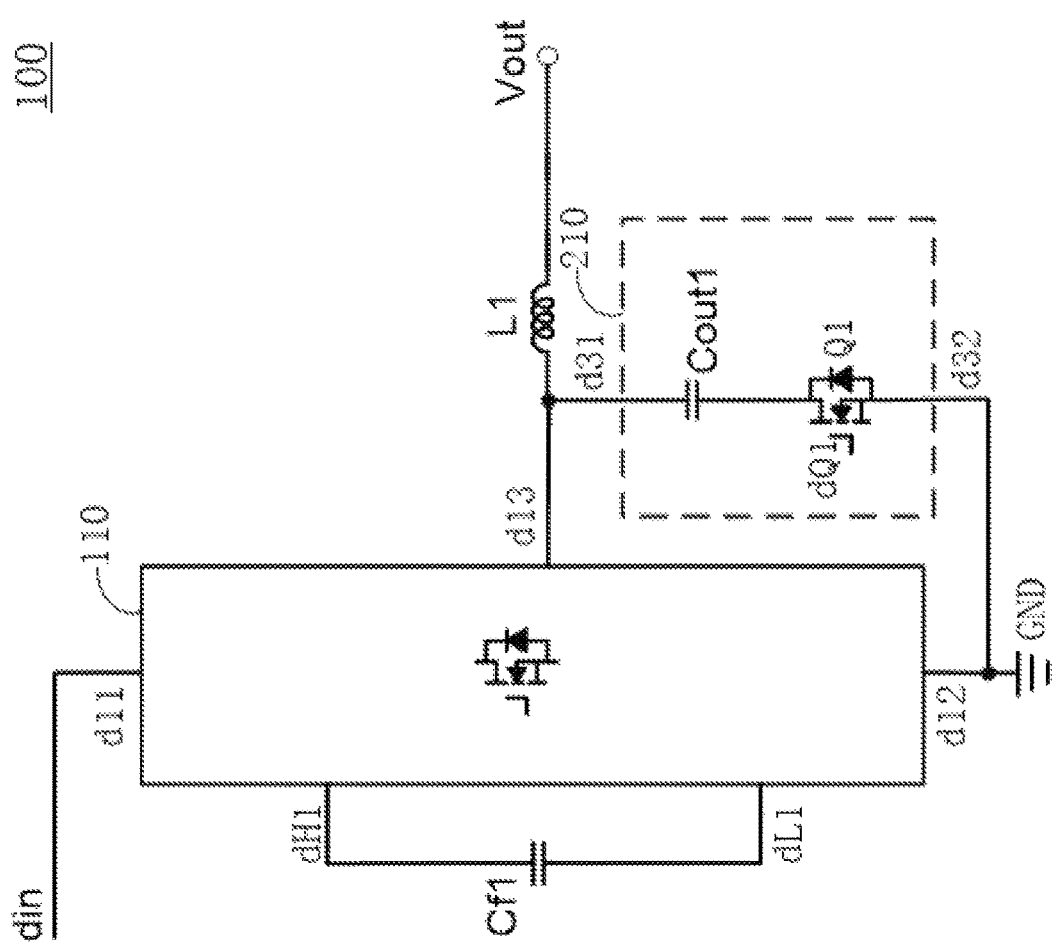
FIG. 3 is a schematic diagram of a power conversion structure of an embodiment of the present invention.

Furthermore, as shown in FIG. 3, the power conversion structure can be switched to the switched capacitor converter mode with only one first switch Q1. Compared with the prior art, the number of switches is reduced and the on-state loss is reduced, the efficiency of the power conversion structure is improved, the cost is reduced, and the area is saved. In addition, a driving circuit of the first switch Q1 is simple.

Figure 4:
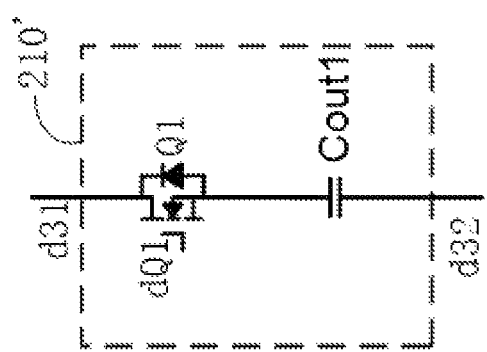
FIG. 4 is a schematic diagram of a circuit of a switched capacitor series branch of another embodiment of the present invention.

Furthermore, as shown in FIG. 3, a first terminal of the first output capacitor Cout1 forms the first terminal d31 of the switched capacitor series branch 210, a second terminal of the first output capacitor Cout1 is connected to a first terminal of the first switch Q1, and a second terminal of the first switch Q1 forms the second terminal of the switched capacitor series branch 210. Or, please refer to a schematic diagram of a circuit of a switched capacitor series branch of another embodiment of the present invention shown in FIG. 4, as shown in FIG. 4, the first terminal of the first switch Q1 forms a first terminal of a switched capacitor series branch 210', the second terminal of the first switch Q1 is connected to the first terminal of the first output capacitor Cout1, and the second terminal of the first output capacitor Cout1 forms a second terminal of the switched capacitor series branch 210'.

In a practical application, the present application is not intended to limit the specific structure of the switched capacitor series branch, as long as the switched capacitor series branch includes the first switch Q1 and the first output capacitor Cout1 connected in series, and when the first switch Q1 is turned off, the first output capacitor Cout1 is connected between the third terminal d13 of the first switch series branch 110 and the ground terminal GND. In addition, the first output capacitor Cout1 here may be formed by one capacitor, or may be formed by connecting a plurality of capacitors in series and/or in parallel. Similarly, the first switch Q1 may be a single switch, or may be a plurality of switches connected in series and/or in parallel.

In the practical application, the power conversion structure shown in FIG. 3 can be configured to operate in a first operating mode. In the first operating mode, the first switch Q1 is configured as an off state, thereby the first switch series branch 110, the first flying capacitor Cf1 and the inductor L1 being configured as a three-level buck converter.

In the practical application, the power conversion structure shown in FIG. 3 can further be configured to operate in a second operating mode. In the second operating mode, the first switch Q1 is configured as an on state, thereby first switch series branch 110, the first flying capacitor Cf1 and the first output capacitor Cout1 being configured as a switched capacitor converter.

As such, the switching between the three-level buck converter and the switched capacitor converter is achieved. That is, the power conversion structure shown in FIG. 3 may have the advantages of both the three-level buck converter and the switched capacitor converter.

Figure 5:
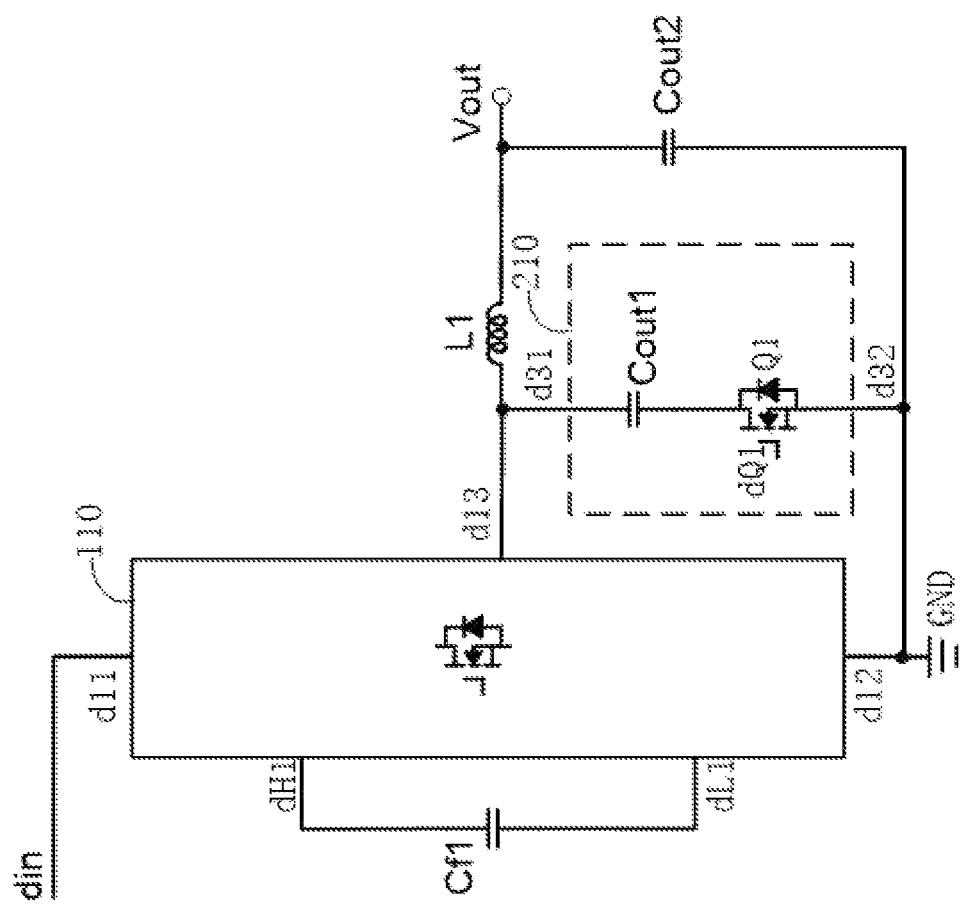
FIG. 5 is a schematic diagram of a power conversion structure of another embodiment of the present invention.

Furthermore, please refer to a schematic diagram of a power conversion structure of another embodiment of the present invention shown in FIG. 5, the power conversion structure further includes a second output capacitor Cout2 connected between a second terminal of the inductor L1 and the ground terminal GND. When the power conversion structure operates in the switched capacitor converter mode, the inductor L1 and the second output capacitor Cout2 form an LC filter unit. As such, on the basis of the filtering of the first output capacitor Cout1, an LC filtering unit is additionally provided compared with the prior art to make ripples of output voltage Vout smaller. In a three-level buck converter mode, the second output capacitor Cout2 forms an output filtering capacitor.

In the practical application, any way capable of turning on or turning off the first switch Q1 by driving is applicable to the present application.

Figure 6:
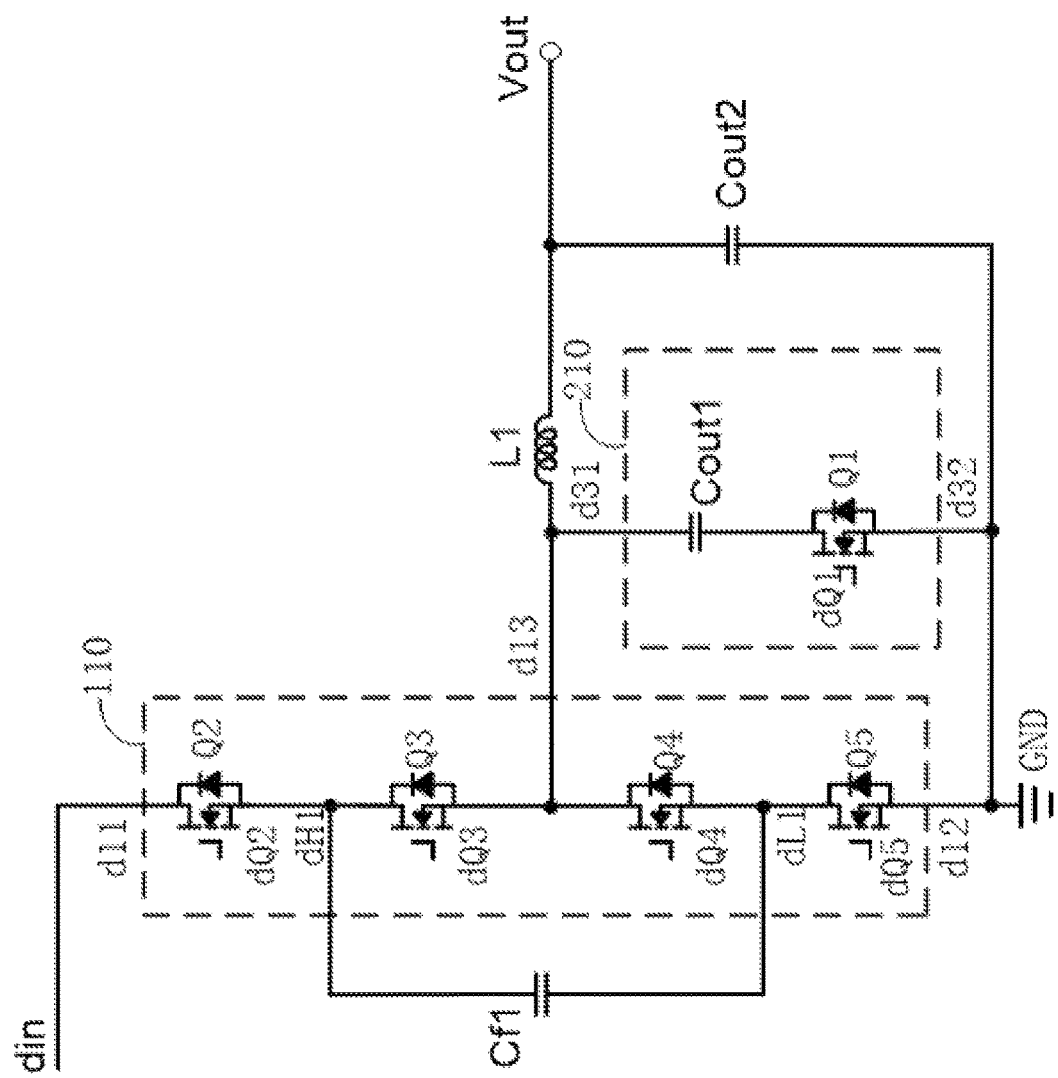
FIG. 6 is a schematic diagram of a power conversion structure of another embodiment of the present invention.

Furthermore, please refer to a schematic diagram of a power conversion structure of another embodiment of the present invention shown in FIG. 6, the first switch series branch 110 includes a second switch Q2, a third switch Q3, a fourth switch Q4, and a fifth switch Q5 connected in series. The second switch Q2 is connected between the input terminal din and the first upper plate node dH1 and has a second control node dQ2. The third switch Q3 is connected between the first upper plate node dH1 and the third terminal d13 of the first switch series branch 110 and has a third control node dQ3. The fourth switch Q4 is connected between the third terminal d13 of the first switch series branch 110 and the first lower plate node dL1 and has a fourth control node dQ4. The fifth switch Q5 is connected between the first lower plate node dL1 and the ground terminal GND and has a fifth control node dQ5.

As such, the second switch Q2 to the fifth switch Q5, the first flying capacitor Cf1 and the first output capacitor Cout1 may form the switched capacitor converter. Specifically, the function of the switched capacitor converter can be achieved by sequentially controlling the second switch Q2 and the fourth switch Q4 to be turned on simultaneously and the third switch Q3 and the fifth switch Q5 to be turned on simultaneously.

As such, the second switch Q2 to the fifth switch Q5, the first flying capacitor Cf1 and the inductor L1 may form the three-level buck converter. Specifically, the function of the three-level buck converter can be achieved by sequentially controlling the second switch Q2 and the fourth switch Q4 to be turned on simultaneously, the fourth switch Q4 and the fifth switch Q5 to be turned on simultaneously, the third switch Q3 and the fifth switch Q5 to be turned on simultaneously, and the fourth switch Q4 and the fifth switch Q5 to be turned on simultaneously.

In the practical application, the present application is not intended to limit the first switch series branch 110 as a specific structure shown in FIG. 6, as long as the first switch series branch 110, the first flying capacitor Cf1 and the first output capacitor Cout1 can form the switched capacitor converter, and the first switch series branch 110, the first flying capacitor Cf1 and the inductor L1 can form the three-level buck converter.

In the practical application, in order to improve the charging speed of the battery, it is expected that the power level of the power conversion structure is as high as possible. Please refer to a schematic diagram of a power conversion structure of another embodiment of the present invention shown in FIG. 7, the power conversion structure further includes a second switch series branch 120 and a second flying capacitor Cf2. The second switch series branch 120 includes a plurality of switches connected in series and includes a first terminal d21, a second terminal d22, a third terminal d23, a second upper plate node dH2 and a second lower plate node dL2. The first terminal d21 of the second switch series branch 120 is connected to the input terminal din, the second terminal d22 of the second switch series branch 120 is connected to the ground terminal GND, and the third terminal d23 of the second switch series branch 120 is connected to the third terminal d13 of the first switch series branch 110. The second flying capacitor Cf2 is connected between the second upper plate node dH2 and the second lower plate node dL2. In the second operating mode, the second switch series branch 120, the second flying capacitor Cf2 and the first output capacitor Cout1 can also be configured as a second-phase switched capacitor converter so as to jointly form a structure of two phase switched capacitor converters in parallel, thus improving the power level of the power conversion structure. For the structure of the two phase switched capacitor converters in parallel, the output current is larger. Compared with the prior art, the power conversion structure of the present invention can further reduce the loss, improve the efficiency and reduce the cost.

Figure 7:
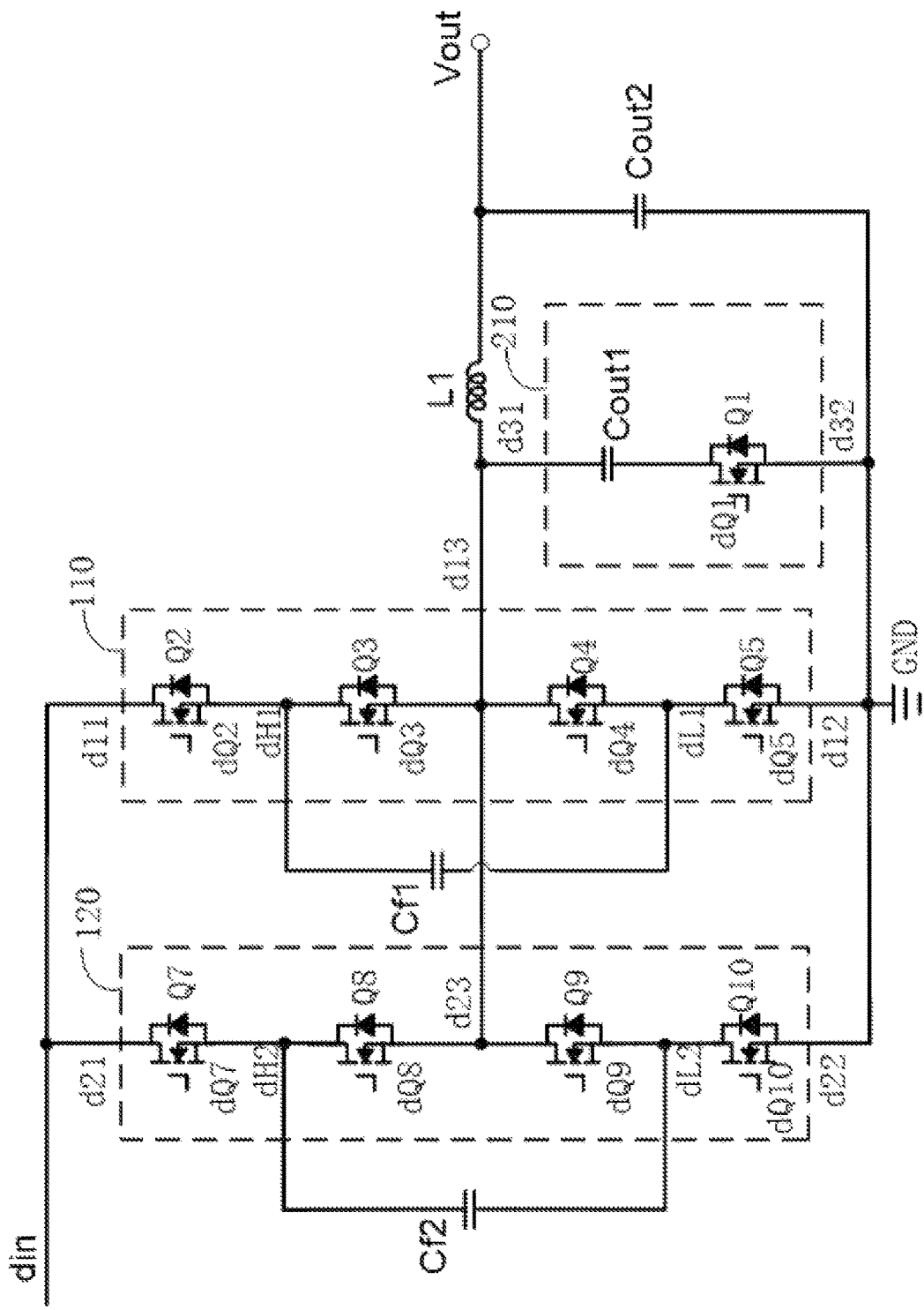
FIG. 7 is a schematic diagram of a power conversion structure of another embodiment of the present invention.

Certainly, in an embodiment of the present application, the power conversion structure may also include n second-phase switched capacitor converters shown in FIG. 7 connected in parallel to achieve n+1-phase switched capacitor converters, wherein n is a positive integer. FIG. 7 takes the two phases as an example only to explain the principle.

More specifically, as shown in FIG. 7, the second switch series branch 120 includes a seventh switch Q7, an eighth switch Q8, a ninth switch Q9 and a tenth switch Q10 connected in series. The seventh switch Q7 is connected between the input terminal din and the second upper plate node dH2 and has a seventh control node dQ7. The eighth switch Q8 is connected between the second upper plate node dH2 and the third terminal d23 of the second switch series branch 120 and has an eighth control node dQ8. The ninth switch Q9 is connected between the third terminal d23 of the second switch series branch 120 and the second lower plate node dL2 and has a ninth control node dQ9. The tenth switch Q10 is connected between the second lower plate node dL2 and the ground terminal GND and has a tenth control node dQ10. Similarly, the present application is not intended to limit the specific structure of the second switch series branch 120.

Figure 8:
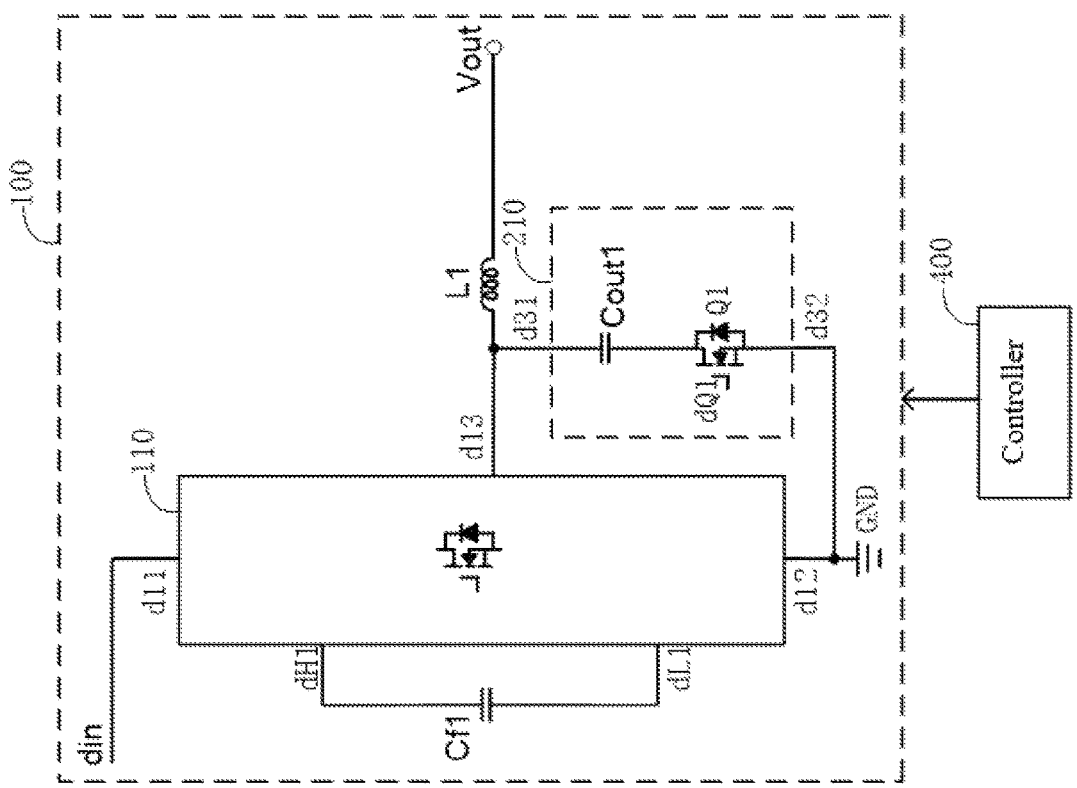
FIG. 8 is a schematic diagram of a power conversion system of an embodiment of the present invention.

In an embodiment of the present invention, a power conversion system is provided, please referring to a schematic diagram of a power conversion system of an embodiment of the present invention shown in FIG. 8. The power conversion system includes the power conversion structure 100 shown in FIG. 3; a control unit 400 connected to the control nodes of the switches in the power conversion structure 100 and configured to output a switch control signal to the control nodes of the switches in the power conversion structure 100 so as to configure the power conversion structure to operate in the first operating mode or the second operating mode. In the first operating mode, the first switch Q1 is configured as an off state, thereby the first switch series branch 110, the first flying capacitor Cf1 and the inductor L1 being configured as a three-level buck converter. In the second operating mode, the first switch Q1 is configured as an on state, thereby the first switch series branch 110, the first flying capacitor Cf1 and the first output capacitor Cout1 being configured as a switched capacitor converter.

The operating principle and advantages of the power conversion system are as described above for the power conversion structure. As such, unnecessary details are not given here.

In an embodiment of the present invention, an electronic device 40 is provided. The electronic device 40 may be a portable device (including mobile phones, tablet computers, digital cameras, MP3 players, watches and/or other similar electronic devices). Specifically, please refer to a schematic diagram of an electronic device of an embodiment of the present invention shown in FIG. 9. The electronic device includes the power conversion structure 100 shown in FIG. 3; a battery 300, wherein a first terminal of the battery 300 is connected to a second terminal of an inductor L1 via a sixth switch Q6, and a second terminal of the battery 300 is grounded; and a load 200 connected to the second terminal of the inductor L1 so as to receive an electric signal Vout output from the second terminal of the inductor L1.

Figure 9:
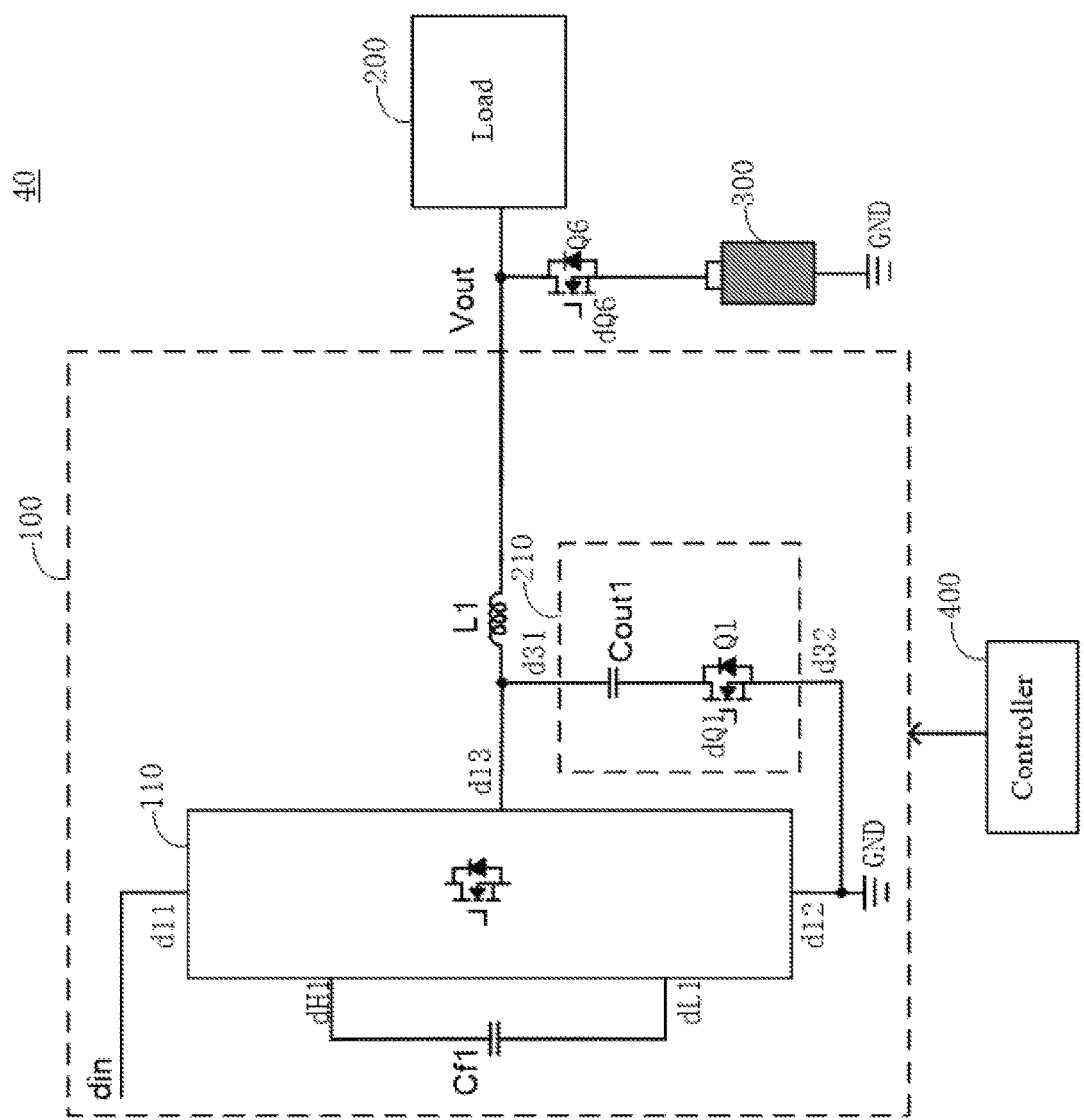
FIG. 9 is a schematic diagram of an electronic device of an embodiment of the present invention.

As shown in FIG. 9, the second terminal of the inductor L1 is the output terminal of the power conversion structure 100. The load 200 may be a power-consuming unit of an electronic device, such as power-consuming units of portable devices (including cell phones, tablet computers, digital cameras, MP3 players, watches, and/or other similar electronic devices). The battery 300 may be a chargeable battery in the electronic device, such as the chargeable batteries in portable devices (including cell phones, tablet computers, digital cameras, MP3 players, watches, and/or other similar electronic devices).

Figure 10:
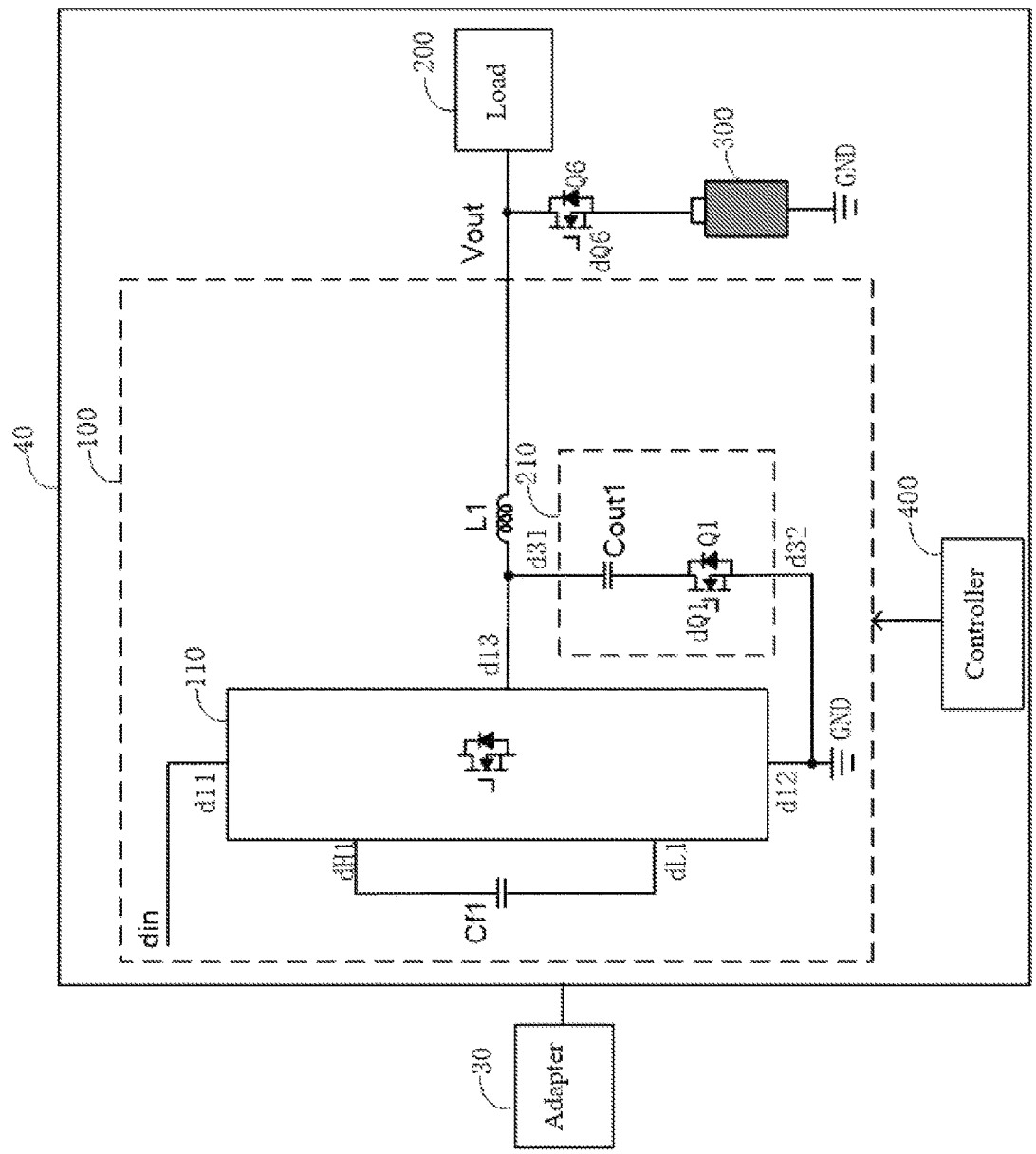
FIG. 10 is a schematic diagram of a power supply system of an embodiment of the present invention.

Please refer to a schematic diagram of a power supply system of an embodiment of the present invention shown in FIG. 10, in the practical application, when the power-consuming unit in the electronic device 40 needs power supply and/or the battery 300 in the electronic device needs to the charged, an adapter 30 is connected to the electronic device 40 to provide an input voltage Vin for the input terminal din of the power conversion structure. In response to different charging conditions of the battery 300, the controller 400 configures the power conversion structure 100 to operate in corresponding modes.

The overall charging process of the battery 300 includes a trickle charging stage, a pre-charging stage, a constant-current charging stage, a constant-voltage charging stage, and a charging termination stage. In an embodiment of the practical application, the first operating mode is configured to perform any stage of trickle charging, pre-charging, a second stage of constant-voltage charging and charging termination of the battery 300. The second operating mode is configured to perform any stage of a first stage of the constant-voltage charging and the constant-current charging of the battery 300, wherein the first stage of the constant-voltage charging stage and the second stage of the constant-voltage charging stage form the constant-voltage charging stage of the battery. As such, the power conversion structure provided by the present application may achieve high efficiency in the overall charging process of the battery 300.

In the practical application, the first stage of the constant-voltage charging refers to a stage that the charging current is reduced to a predetermined current value from a current at the constant-current charging stage, and the second stage of the constant-voltage charging refers to a stage that the charging current is reduced to 0 ampere or a current at the charging termination stage from the predetermined current value. In an embodiment of the present invention, the predetermined current value is 6 amperes.

In the embodiments above, the charging of the battery 300 of the electronic device is achieved while achieving the power supply of the power-consuming unit (i.e., the load 200) of the electronic device by configuring the sixth switch Q6 as an on state. Or, the battery 300 of the electronic device is configured to supply power to the load 200, and the sixth switch Q6 is configured as an off state to only supply power to the power-consuming unit (i.e., the load 200) of the electronic device. That is, the sixth switch Q6 achieves a function of power path management.

In an embodiment of the present invention, the switches each is a MOSFET, including a source, a drain, and a gate, wherein the drain of the second switch Q2 is connected to the input terminal din, the source of the second switch Q2 is connected to the drain of the third switch Q3. the source of the third switch Q3 is connected to the drain of the fourth switch Q4, the source of the fourth switch Q4 is connected to the drain of the fifth switch Q5, and the source of the fifth switch Q5 is grounded. A branch formed by the seventh switch Q7, the eighth switch Q8, the ninth switch Q9 and the tenth switch Q10 and a branch formed by the second switch Q2, the third switch Q3, the fourth switch Q4 and the fifth switch Q5 have the same connection relationship. As such, unnecessary details are not given here. The first terminal of the first switch Q1 is the drain and the second terminal of the first switch is the source.

In an embodiment of the present invention, the switch may also be a bipolar junction transistor, a super-junction transistor, an insulated gate bipolar transistor, a GaN-based power device, and/or a similar device. If a device in the industry can be turned on or turned off by receiving a switch control signal, this device is acceptable.

In an embodiment of the present invention, the switch is achieved by taking a single switch as example. In the practical application, each switch may include a plurality of switches connected in series and/or in parallel.

In an embodiment, the present application further provides a power conversion method. Please refer to FIG. 3 to FIG. 9, the method includes: coupling the power conversion structure to the battery 300, wherein the power conversion structure may refer to FIG. 3; providing an input voltage; and in response to different charging conditions of the battery 300, configuring the power conversion structure as different operating modes.

The power conversion method has the advantages of the power conversion structure shown in FIG. 3. As such, unnecessary details are not given here.

Furthermore, in response to different charging conditions of the battery 300, the power conversion structure is configured to operate in different operating modes, including: in response to a condition of a first charging stage of the battery 300, configuring the power conversion structure as a first operating mode, wherein in the first operating mode, the first switch Q1 is configured as an off state, thereby the first switch series branch 110, the first flying capacitor Cf1 and the inductor L1 being configured as a three-level buck converter; in response to a condition of a second charging stage of the battery 300, configuring the power conversion structure as a second operating mode, wherein in the second operating mode, the first switch Q1 is configured as an on state, thereby the first switch series branch 110, and the first flying capacitor Cf1 and the first output capacitor Cout1 being configured as a switched capacitor converter. The operating principles and functions thereof are the same as those of the power conversion structure shown in FIG. 3 and FIG. 5. As such, unnecessary details are not given here.

In an embodiment of the practical application, the overall charging process of the battery 300 includes a trickle charging stage, a pre-charging stage, a constant-voltage charging stage, a constant-current charging stage, and a charging termination stage. The first charging stage is any stage of trickle charging, pre-charging, a second stage of constant-voltage charging, and charging termination of the battery 300. The second charging stage is any stage of the first stage of the constant-voltage charging and the constant-current charging of the battery 300, wherein the first stage of the constant-voltage charging stage and the second stage of the constant-voltage charging stage form a constant-voltage charging stage of the battery. As such, the power conversion method provided by the present application may achieve high efficiency in the overall charging process of the battery 300.

Similar to the power conversion structure above, the power conversion structure may further include a second switch series branch 120 and a second flying capacitor Cf2. In the second operating mode, the power conversion method further includes configuring the second switch series branch 120, the second flying capacitor Cf2 and the first output capacitor Cout1 as a switched capacitor converter. The operating principles and functions thereof are the same as those of the power conversion structure above. As such, unnecessary details are not given here.

Figure 11A:
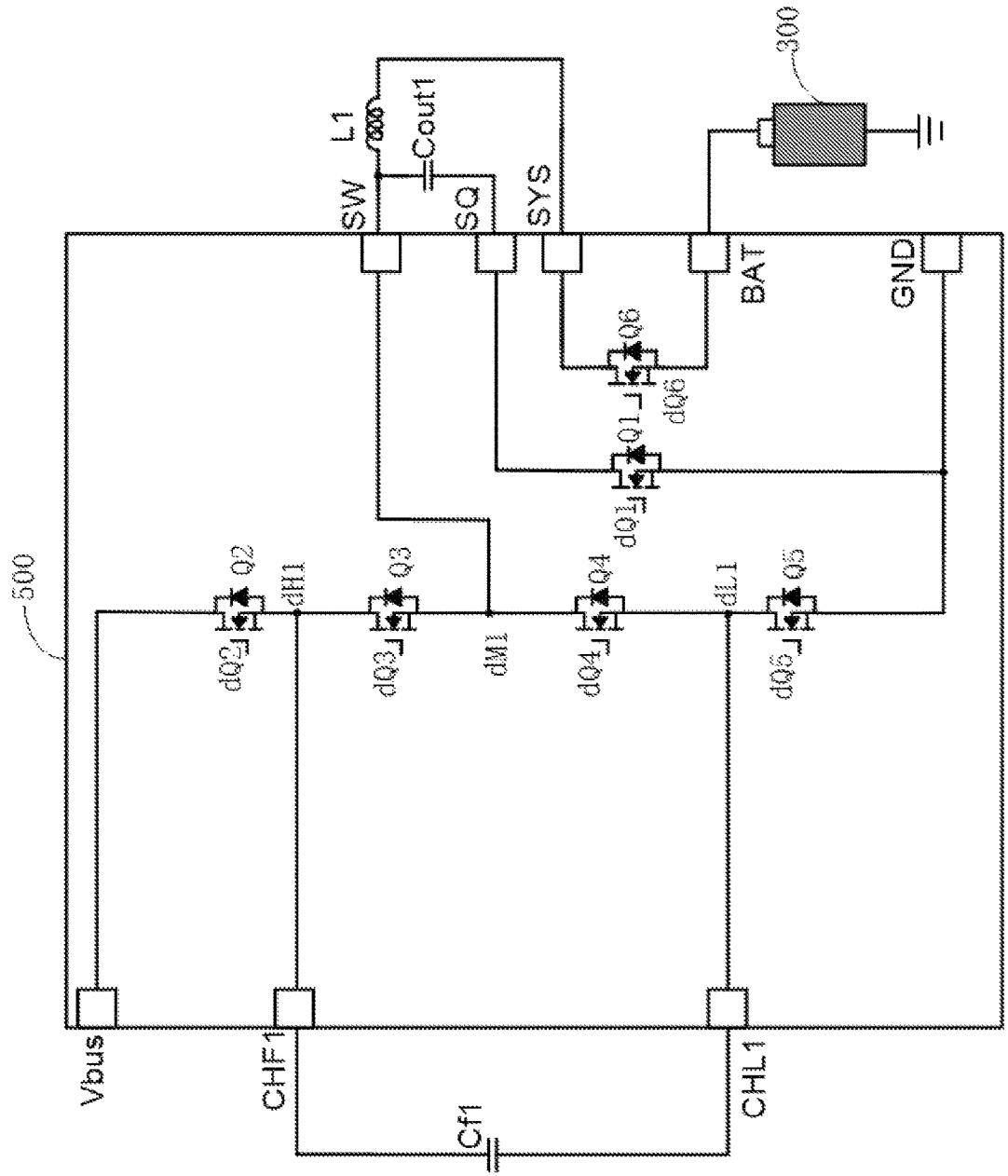
FIG. 11a is a schematic diagram of a circuit of a chip unit of an embodiment of the present invention.
Figure 11B:
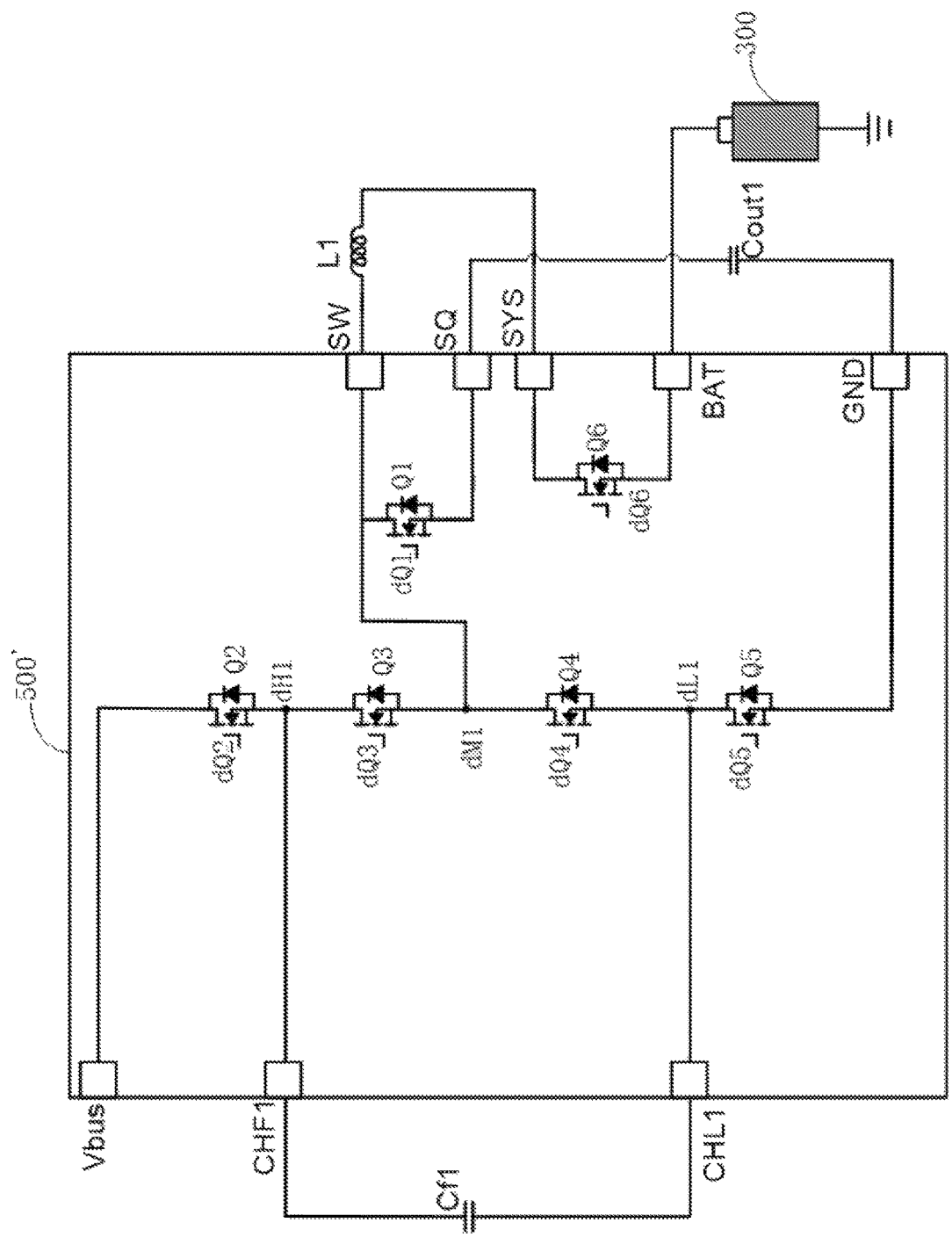
FIG. 11b is a schematic diagram of a circuit of a chip unit of another embodiment of the present invention.

In an embodiment of the present invention, a chip unit is further provided, specifically referring to a schematic diagram of a circuit of a chip unit of an embodiment of the present invention shown in FIG. 11a and a schematic diagram of a circuit of a chip unit of another embodiment of the present invention shown in FIG. 11b. As shown in FIG. 11a and 11b, the chip unit 500 and the chip unit 500' each includes an input pin Vbus, a conversion pin SW, a system terminal pin SYS, a battery terminal pin BAT, a ground pin GND, a first flying capacitor upper pin CHF1, a first flying capacitor lower pin CHL1, and a switch pin SQ. The chip unit 500 and the chip unit 500' each is internally integrated with a second switch Q2 connected between the input pin Vbus and a first upper plate node dH1 and having a second control node dQ2; a third switch Q3 connected between the first upper plate node dH1 and a first intermediate node dM1 and having a third control node dQ3, wherein the first intermediate node dM1 is connected to the conversion pin SW which is configured to connect a first terminal of an inductor L1 located outside the chip unit 500 and the chip unit 500'; a fourth switch Q4 connected between the first intermediate node dM1 and the first lower plate node dL1 and having a fourth control node dQ4; a fifth switch Q5 connected between the first lower plate node dL1 and the ground pin GND and having a fifth control node dQ5; a first switch Q1, wherein a first terminal of the first switch Q1 is connected to the switch pin SQ, a second terminal of the first switch Q1 is connected to the ground pin GND, the first switch Q1 has a first control node dQ1, the switch pin SQ is configured to connect the first terminal of the first output capacitor Cout1 located outside the chip unit 500, and the second terminal of the first output capacitor Cout1 is connected to the first terminal of the inductor L1, or the first terminal of the first switch Q1 is connected to the conversion pin SW, the second terminal of the first switch Q1 is connected to the switch pin SQ, the first switch Q1 has a first control node dQ1, the switch pin SQ is configured to connect the first terminal of the first output capacitor Cout1 located outside the chip unit 500', and the second terminal of the first output capacitor Cout1 is connected to the ground pin GND; a first flying capacitor upper pin CHF1 connected to the first upper plate node dH1 and configured to connect the first terminal of the first flying capacitor Cf1 located outside the chip unit 500 and the chip unit 500'; a first flying capacitor lower pin CHL1 connected to the first lower plate node dL1 and configured to connect the second terminal of the first flying capacitor Cf1 located outside the chip unit 500 and the chip unit 500'; a system terminal pin SYS configured to connect the second terminal of the inductor L1; and a battery terminal pin BAT configured to connect a battery 300 located outside the chip unit 500 and the chip unit 500'.

The principles and effects thereof are the same as those of the power conversion structure above. As such, unnecessary details are not given here.

As shown in FIG. 11*a* and FIG. 11*b*, the chip unit 500 and the chip unit 500' each is further integrally integrated with a sixth switch Q6 connected between the system terminal pin SYS and the battery terminal pin BAT and having a sixth control node dQ6. The principles and effects thereof are the same as those of the power conversion structure above. As such, unnecessary details are not given here.

Figure 12:
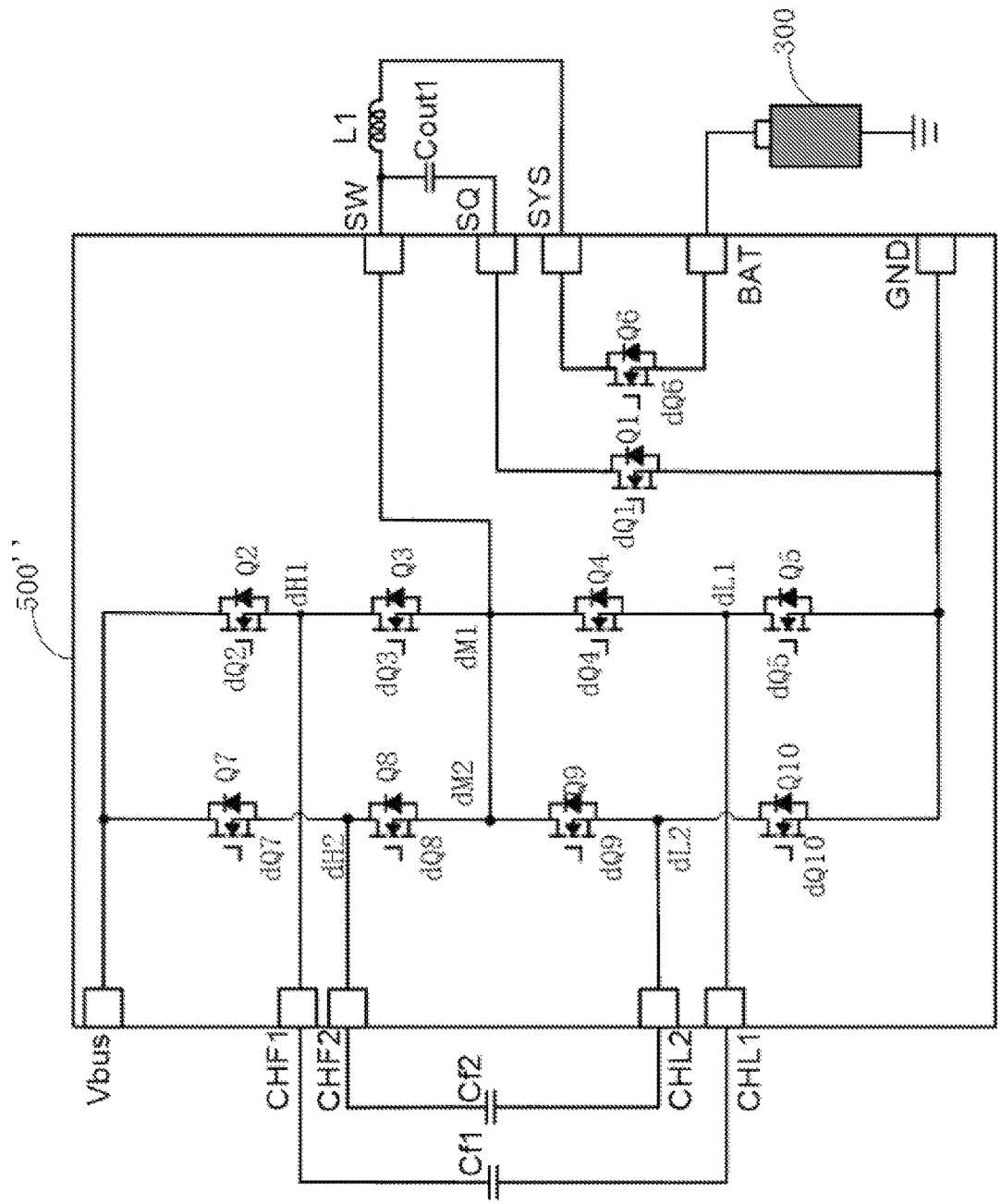
FIG. 12 is a schematic diagram of a circuit of a chip unit of another embodiment of the present invention.

Similar to the power conversion structure above, please refer to a schematic diagram of a circuit of a chip unit of another embodiment of the present invention shown in FIG. 12, a chip unit 500" is internally integrated with a seventh switch Q7, an eighth switch Q8, a ninth switch Q9 and a tenth switch Q10, the connection relation of which is the same as that of the power conversion structure above. As such, unnecessary details are not given here. The chip unit 500" further includes a second flying capacitor upper pin CHF2 and a second flying capacitor lower pin CHL2. The second flying capacitor upper pin CHF2 is connected to a second upper plate node dH2 and configured to connect a first terminal of the second flying capacitor Cf2 located outside the chip unit 500". The second flying capacitor lower pin CHL2 is connected to a second lower plate node dL2 and configured to connect a second terminal of the second flying capacitor Cf2 located outside the chip unit 500". The principles and effects thereof are the same as those of the power conversion structure above. As such, unnecessary details are not given here.

As the chip units shown in FIG. 11*a*, FIG. 11*b*, and FIG. 12, the integration level of the chip unit can be improved by integrating the switches inside the chip unit and providing the inductor, the capacitor and the other devices with large volume outside the chip unit, thus the chip unit conforms to the demand of high level of integration of the power supply chip at present. In addition, the electric power conversion function can be achieved by only configuring a corresponding inductor and/or capacitor outside the chip unit, thus the application flexibility of the chip unit is improved. The chip units shown in FIG. 11*a*, FIG. 11*b* and FIG. 12 may operate in the first operating mode or the second operating mode of the power conversion structure 100 above by cooperating with a peripheral inductor and/or capacitor, and the technical effects thereof are the same.

Finally, it should be noted that the above embodiments are only used to illustrate the technical solutions of the present invention rather than limiting the same. Although the present invention has been described in detail with reference to the foregoing embodiments, it should be understood by those of ordinary skill in the art that it is still possible to modify the technical solutions recorded in the foregoing embodiments, or to equivalently replace some or all of technical features; and that these modifications or replacements do not make the essence of the corresponding technical solutions deviate from the scope of the technical solutions of the embodiments of the present invention.

What is claimed is:

1. A power conversion structure comprising:
   an input terminal receiving an input voltage;
   a first switch series branch comprising a plurality of switches connected in series and comprising a first terminal, a second terminal, a third terminal, a first upper plate node, and a first lower plate node, wherein:
      the first terminal of the first switch series branch is connected to the input terminal;
      the second terminal of the first switch series branch is connected to a ground terminal; and
      the third terminal of the first switch series branch is connected to a first terminal of an inductor;
   a first flying capacitor connected between the first upper plate node and the first lower plate node; and
   a switched capacitor series branch comprising a first terminal and a second terminal, wherein:
      the first terminal of the switched capacitor series branch is connected to the third terminal of the first switch series branch;
      the second terminal of the switched capacitor series branch is connected to the ground terminal; and
      the switched capacitor series branch comprises a first switch and a first output capacitor connected in series, the first switch having a first control node, wherein:
      the power conversion structure is configured to charge a battery via a second terminal of the inductor, and wherein:
         in response to a condition of a first charging stage of the battery, the power conversion structure is configured as a first operating mode, and in the first operating mode, the first switch is configured as an off state, thereby the first switch series branch, the first flying capacitor and the inductor being configured as a three-level buck converter; and
         in response to a condition of a second charging stage of the battery, the power conversion structure is configured as a second operating mode, and in the second operating mode, the first switch is configured as an on state, thereby the first switch series branch, the first flying capacitor and the first output capacitor being configured as a switched capacitor converter, and wherein:
            the first charging stage comprises any stage of a trickle charging stage, a pre-charging stage, a second stage of a constant-voltage charging stage, and a charging termination stage of the battery; and
            the second charging stage comprises any stage of a first stage of the constant-voltage charging stage and a constant-current charging stage of the battery, and wherein the first stage of the constant-voltage charging stage and the second stage of the constant-voltage charging stage forms the constant-voltage charging stage of the battery.

2. The power conversion structure of claim 1, wherein:
a first terminal of the first output capacitor forms the first terminal of the switched capacitor series branch;
a second terminal of the first output capacitor is connected to a first terminal of the first switch; and
a second terminal of the first switch forms the second terminal of the switched capacitor series branch.

3. The power conversion structure of claim 1, wherein:
the first terminal of the first switch forms the first terminal of the switched capacitor series branch;
the second terminal of the first switch is connected to the first terminal of the first output capacitor; and
the second terminal of the first output capacitor forms the second terminal of the switched capacitor series branch.

4. The power conversion structure of claim 1, further comprising:
a second output capacitor connected between the second terminal of the inductor and the ground terminal.

5. The power conversion structure of claim 1, wherein:
the first switch series branch comprises a second switch, a third switch, a fourth switch and a fifth switch connected in series;
the second switch is connected between the input terminal and the first upper plate node and has a second control node;
the third switch is connected between the first upper plate node and the third terminal of the first switch series branch and has a third control node;
the fourth switch is connected between the third terminal of the first switch series branch and the first lower plate node and has a fourth node; and
the fifth switch is connected between the first lower plate node and the ground terminal and has a fifth control node.

6. The power conversion structure of claim 1, further comprising:
a second switch series branch and a second flying capacitor, wherein:
the second switch series branch comprises a plurality of switches connected in series and comprises a first terminal, a second terminal, a third terminal, a second upper plate node, and a second lower plate node;
the first terminal of the second switch series branch is connected to the input terminal;
the second terminal of the second switch series branch is connected to the ground terminal;
the third terminal of the second switch series branch is connected to the third terminal of the first switch series branch; and
the second flying capacitor is connected between the second upper plate node and the second lower plate node.

7. The power conversion structure of claim 6, wherein:
the second switch series branch comprises a seventh switch, an eighth switch, a ninth switch, and a tenth switch connected in series;
the seventh switch is connected between the input terminal and the second upper plate node and has a seventh control node;
the eighth switch is connected between the second upper plate node and the third terminal of the second switch series branch and has an eighth control node;
the ninth switch is connected between the third terminal of the second switch series branch and the second lower plate node and has a ninth control node; and
the tenth switch is connected between the second lower plate node and the ground terminal and has a tenth control node.

8. A power conversion method comprising:
coupling a power conversion structure to a battery, wherein the power conversion structure comprises:
an input terminal receiving an input voltage;
a first switch series branch comprising a plurality of switches connected in series and comprising a first terminal, a second terminal, a third terminal, a first upper plate node, and a first lower plate node, wherein:
the first terminal of the first switch series branch is connected to the input terminal;
the second terminal of the first switch series branch is connected to a ground terminal; and
the third terminal of the first switch series branch is connected to a first terminal of an inductor;
a first flying capacitor connected between the first upper plate node and the first lower plate node;
a switched capacitor series branch comprising a first terminal and a second terminal, wherein:
the first terminal of the switched capacitor series branch is connected to the third terminal of the first switch series branch;
the second terminal of the switched capacitor series branch is connected to the ground terminal; and
the switched capacitor series branch comprises a first switch and a first output capacitor connected in series, the first switch having a first control node;
providing the input voltage;
in response to a condition of a first charging stage of the battery, configuring the power conversion structure as a first operating mode, and in the first operating mode, configuring the first switch as an off state, and configuring the first switch series branch, the first flying capacitor and the inductor as a three-level buck converter; and
in response to a condition of a second charging stage of the battery, configuring the power conversion structure as a second operating mode, and in the second operating mode, configuring the first switch as an on state, and configuring the first switch series branch, the first flying capacitor and the first output capacitor as a switched capacitor converter, and wherein:
the first charging stage comprises any stage of a trickle charging stage, a pre-charging stage, a second stage of a constant-voltage charging stage, and a charging termination stage of the battery; and
the second charging stage comprises any stage of a first stage of the constant-voltage charging stage and a constant-current charging stage of the battery, wherein the first stage of the constant-voltage charging stage and the second stage of the constant-voltage charging stage forms the constant-voltage charging stage of the battery.

9. The power conversion method of claim 8, wherein:
the power conversion structure further comprises a second switch series branch and a second flying capacitor, and wherein:
the second switch series branch comprises a plurality of switches connected in series and comprises a first terminal, a second terminal, a third terminal, a second upper plate node, and a second lower plate node;

the first terminal of the second switch series branch is connected to the input terminal;

the second terminal of the second switch series branch is connected to the ground terminal;

the third terminal of the second switch series branch is connected to the third terminal of the first switch series branch; and the second flying capacitor is connected between the second upper plate node and the second lower plate node, and wherein when the power conversion structure is configured to operate in the second operating mode, the power conversion method further comprises configuring the second switch series branch, the second flying capacitor and the first output capacitor as the switched capacitor converter.

10. A chip unit comprising:

an input pin receiving an input voltage;

a second switch connected between the input pin and a first upper plate node and having a second control node;

a third switch connected between the first upper plate node and a first intermediate node and having a third control node, wherein the first intermediate node is connected to a conversion pin, and the conversion pin is configured to connect a first terminal of an inductor located outside of the chip unit;

a fourth switch connected between the first intermediate node and a first lower plate node and having a fourth control node;

a fifth switch connected between the first lower plate node and a ground pin and having a fifth control node;

a first switch, wherein:
 a first terminal of the first switch is connected to a switch pin and a second terminal of the first switch is connected to the ground pin; the first switch has a first control node; the switch pin is configured to connect a first terminal of a first output capacitor located outside the chip unit; a second terminal of the first output capacitor is connected to the first terminal of the inductor, or, the first terminal of the first switch is connected to the conversion pin; the second terminal of the first switch is connected to the switch pin; the first switch has the first control node; the switch pin is configured to connect the first terminal of the first output capacitor located outside the chip unit; and the second terminal of the first output capacitor is connected to the ground terminal;

a first flying capacitor upper pin connected to the first upper plate node and configured to connect a first terminal of a first flying capacitor located outside of the chip unit;

a first flying capacitor lower pin connected to the first lower plate node and configured to connect a second terminal of the first flying capacitor located outside of the chip unit;

a system terminal pin configured to connect a second terminal of the inductor; and a battery terminal pin configured to connect a battery located outside the chip unit, wherein:
 in response to the condition of a first charging stage of the battery, the first switch is configured to be turned off; and
 in response to the condition of a second charging stage of the battery, the first switch is configured to be turned on, and wherein:
  the first charging stage comprises any stage of a trickle charging stage, a pre-charging stage, a second stage of a constant-voltage charging stage, and a charging termination stage of the battery; and
  the second charging stage comprises any stage of a first stage of the constant-voltage charging stage and a constant-current charging stage of the battery, and wherein the first stage of the constant-voltage charging stage and the second stage of the constant-voltage charging stage forms the constant-voltage charging stage of the battery.

11. The chip unit of claim 10, further comprising:

a sixth switch connected between the system terminal pin and the battery terminal pin and having a sixth control node.

12. The chip unit of claim 10, further comprising:

a seventh switch connected between the input pin and a second upper plate node and having a seventh control node;

an eighth switch connected between the second upper plate node and a second intermediate node and having an eighth control node, wherein the second intermediate node is connected to the first intermediate node;

a ninth switch connected between the second intermediate node and a second lower plate node and having a ninth control node;

a tenth switch connected between the second lower plate node and the ground pin and having a tenth node;

a second flying capacitor upper pin connected to the second upper plate node and configured to connect a first terminal of a second flying capacitor outside the chip unit; and a second flying capacitor lower pin connected to the second lower plate node and configured to connect a second terminal of the second flying capacitor outside the chip unit.

\* \* \* \* \*